Sept. 27, 1966  A. A. FOWLE ETAL  3,274,795
FLUID OPERATING APPARATUS
Filed April 30, 1964  6 Sheets-Sheet 1

Arthur A. Fowle
Theodore P. Heuchling
Richard E. Kronauer  INVENTORS
Allen Latham, Jr.
Charles A. Schulte
BY Burnie A. Lyynes
Attorney Sept. 27, 1966     A. A. FOWLE ET AL     3,274,795

FLUID OPERATING APPARATUS

Filed April 30, 1964     6 Sheets-Sheet 3

Arthur A. Fowle
Theodore P. Heuchling
Richard E. Kronauer INVENTORS
Allen Latham, Jr.
BY   Charles A. Schulte Attorney Sept. 27, 1966    A. A. FOWLE ETAL    3,274,795
FLUID OPERATING APPARATUS Filed April 30, 1964    6 Sheets-Sheet 4

Arthur A. Fowle
Theodore P. Heuchling
Richard E. Kronauer    INVENTORS
Allen Latham, Jr.
BY    Charles A. Schulte Attorney Sept. 27, 1966  A. A. FOWLE ETAL  3,274,795
FLUID OPERATING APPARATUS
Filed April 30, 1964                           6 Sheets-Sheet 6

Arthur A. Fowle
Theodore P. Heuchling
Richard E. Kronauer  INVENTORS
Allen Latham, Jr.
Charles A. Schulte
BY Attorney

United States Patent Office 3,274,795
Patented Sept. 27, 1966

3,274,795
FLUID OPERATING APPARATUS
Arthur A. Fowle, Winchester, Theodore P. Heuchling, Concord, Allen Latham, Jr., Jamaica Plain, Charles A. Schulte, Lexington, and Richard E. Kronauer, Harvard, Mass., assignors to Arthur D. Little Inc., Cambridge, Mass., a corporation of Massachusetts
Filed Apr. 30, 1964, Ser. No. 363,740
27 Claims. (Cl. 62—403)

This invention relates to apparatus which exerts force on a fluid or on which a force is exerted by a fluid. If the fluid is compressible the apparatus may be used as a compressor, an expansion engine, or a refrigerator. If the fluid is noncompressible then the apparatus may be used as a pump or the like.

There is a need for small-volume, highly reliable apparatus employing a fluid in its operation and capable of operating for extended periods of time without servicing or replacement of parts. As an example of this type of apparatus, it may be cited that it would be highly desirable to have available a small compressor, expander or refrigerator capable of delivering compressed fluid, expanded cooled fluid, or refrigeration to a load (such as a sensitive detection device) which could operate unattended for an extremely long period of time.

There are, of course, many apparatus known in the art capable of performing compression, expansion or refrigeration. However, these incorporate positively-seating valves and require solid-to-solid contact of moving parts which in turn cause sliding friction and demand some form of lubrication. Typically, they also employ rubber sealing rings to seal the high-pressure spaces. The apparatus of the prior art also experiences mechanical drive losses and wear common to conventional reciprocating devices having heavily-loaded bearings, gears, cams and the like. To carry the heavy bearing loads hydrocarbon lubricants are employed which in cryogenic refrigerators, at least, cause trouble by contaminating the working fluid and condensing out in solid form in the heat exchangers and engines. This means that apparatus of this nature experiences mechanical wear and requires periodic maintenance and cannot be left unattended for extended periods of time, for example, one or more years. Moreover, most of the apparatus of this type known in the art is either bulky or heavy, and is unsuitable for use in space craft, airplanes and the like. It would, therefore, be desirable to have available a small, compact apparatus which is capable of compressing or expanding fluid or of delivering refrigeration, the apparatus being highly reliable and possessing a long life due, in great part, to the absence of wearing surfaces and of positively-seating valve means.

It is, therefore, a primary object of this invention to provide apparatus which is capable of exerting a force on a compressible fluid or on which a force may be exerted by a compressible fluid to provide means for compression, expansion or refrigeration of the fluid; or for pumping a noncompressible fluid. It is another object of this invention to provide apparatus of the character described which is highly reliable and which has no wearing surfaces which would cause it to require servicing or replacement of parts. It is yet another object of this invention to provide apparatus of the character described which is highly efficient yet is light in weight and small in volume. It is still another object of this invention to provide a fluid operable apparatus which eliminates mechanical drive losses such as those experienced through the use of heavily loaded bearings, gears and cams. It is another primary object of this invention to provide such apparatus in which forces may be balanced to minimize bearing loads and vibrations. It is still another object of this invention to provide unique and novel apparatus which may be used as a compressor, an expander, or a refrigerator. Other objects of the invention will in part be obvious and will in part be apparent hereinafter.

The invention accordingly comprises features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which FIG. 1 is a cross-section of one embodiment of the apparatus of this invention shown in somewhat diagrammatic fashion;

Figure 11:
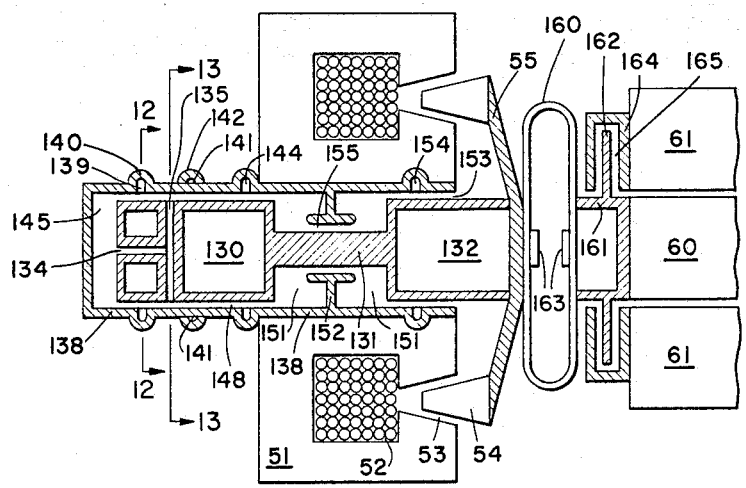
FIG. 11 is a cross-sectional view of one end of another modification of the apparatus of this invention.
Figure 12:
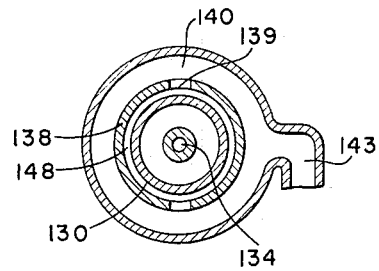
Figure 13:
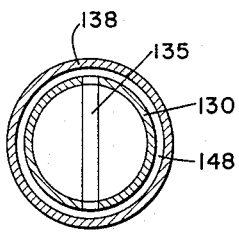
Figure 14:
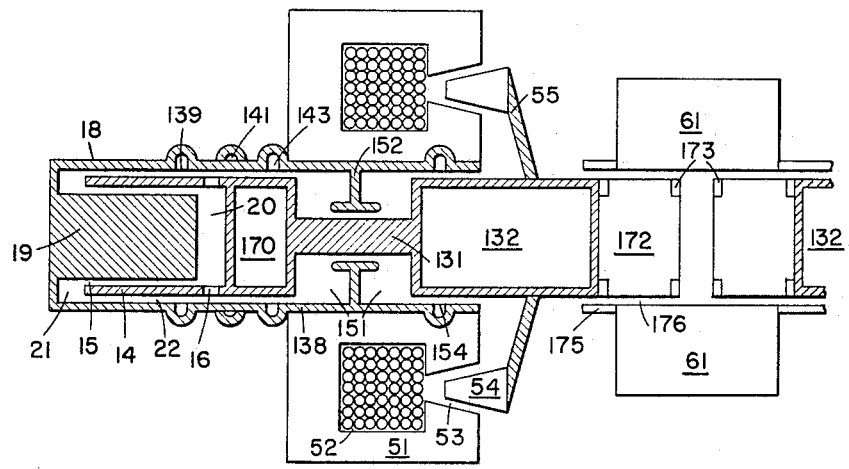
Figure 15:
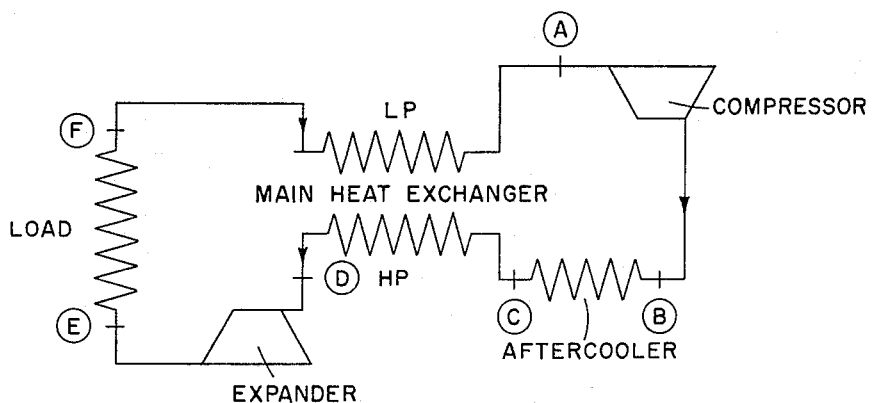
Figure 16:
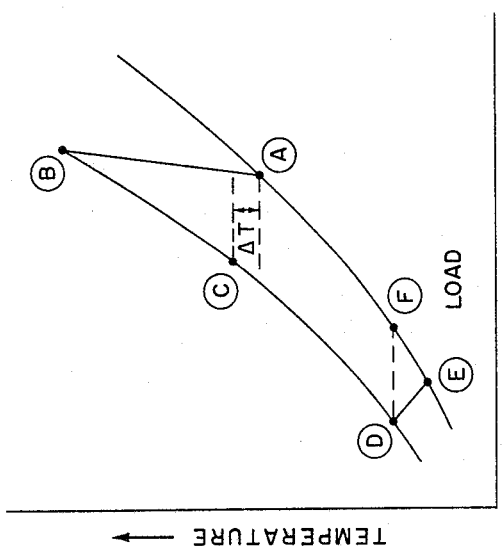
Figure 17:
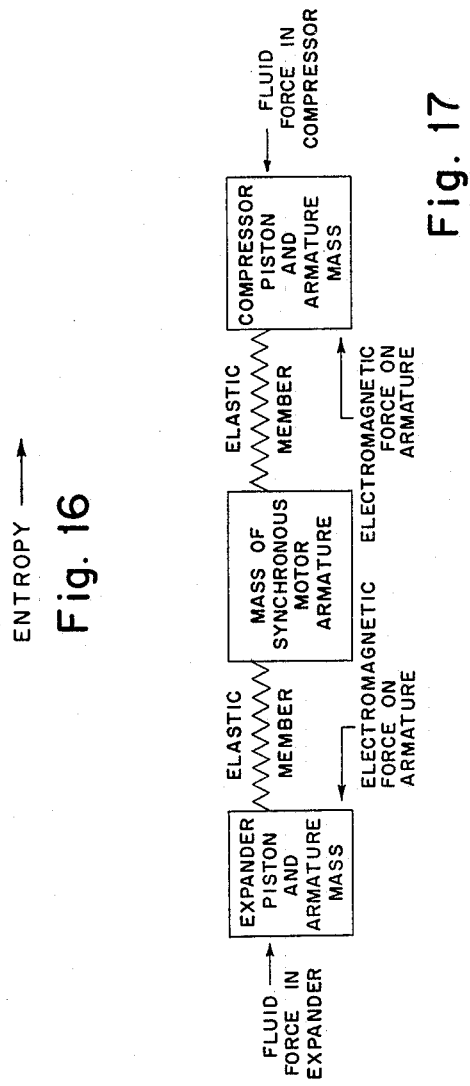

FIGS. 12 and 13 are cross sectional views of the piston of FIG. 11 along lines 12—12 and 13—13, respectively;

FIG. 14 is a cross-sectional view of one end of another modification of the apparatus of this invention;

FIG. 15 is a schematic of the cycle of this apparatus when it is employed as a refrigerator;

FIG. 16 is a temperature-entropy plot of the cycle of the apparatus when used as a refrigerator as detailed in FIG. 15; and FIG. 17 is a schematic of the mechanical arrangement and of the balancing of the mechanical forces involving the apparatus when used as a refrigerator.

The apparatus of this invention may be generally described as a reciprocating, fluid operating apparatus involving direct electromagnetic actuation of pistons. All of the modifications illustrated involve the use of a linear actuator actuated by periodic electric current, operating on a variable reluctance principle and coupled directly to a piston and through an elastic member to ground. The elastic member is either a solid spring or a fluid spring. Its function is to provide necessary acceleration forces to the piston and armature assembly with which it resonates, thus requiring the reciprocating actuator to develop only the working forces required by the fluid process. There are also provided rotating means for achieving rotation of the piston, or a sleeve around it, simultaneously with its reciprocation.

In all cases, valving of the fluid process is accomplished by means of slide valves which are timed by the action of a rotary synchronous motor of either the reluctance or the permanent-magnet type which is excited in synchronism with the reciprocating actuator. In its preferred embodiment there are two slide valves diametrically opposite to one another in each working chamber. Consequently, one-half a revolution is required for the synchronous motor for each cycle of reciprocating. The rotational motion provided by the synchronous motor may also be used to generate fluid films on which the rotating assembly may be supported.

In the illustrations presented the assemblies are symmetrical about a central plane perpendicular to the axis of rotation, but such symmetry is not always necessary or desirable. However, the preferred arrangement is a two-cylinder device with the pistons in the cylinders reciprocating in phase operation in a manner such as to provide continually a balance among all of the axial forces. This balance can be achieved by the detailed symmetry shown in the figures; but it can also be achieved without this detailed symmetry as in the case of a compressor-expander combination which is described later. However, it is also possible to realize some of the advantages of this apparatus of this invention in a single cylinder device comprising the central rotating means and one end of the apparatus shown in the drawings.

In the two cylinder devices, both cylinders may be compressors, both expanders or, as mentioned above, one may be a compressor and one an expander.

Figure 1:
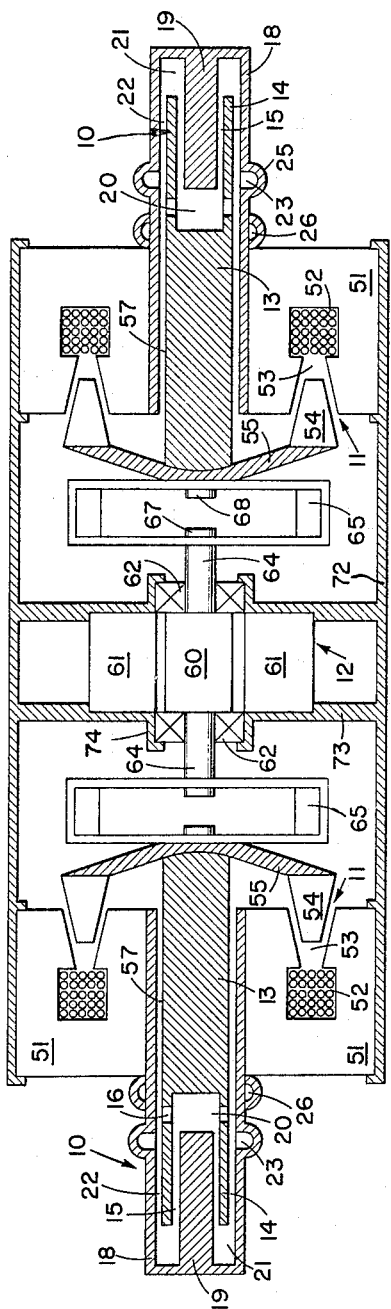

The embodiment illustrated in cross-section and in somewhat diagrammatic fashion in FIG. 1 shows an arrangement employing rotating and reciprocating pistons, metallic springs and ball bearings supporting the synchronous motor rotor. The lightly-loaded ball bearings provide radial support for that rotor and, additionally, counteract any unbalance in the elastic forces developed in the two springs. Turning now to FIG. 1, it will be seen to be generally comprised of two diametrically opposed pistons 10, a linear actuator 11 associated with each of these pistons and a rotary actuator 12 which is centrally positioned within the apparatus and serves to rotate both pistons. Inasmuch as it is necessary to provide direct linear actuation of the pistons to impart to them the necessary reciprocating motion, it is required that means for effecting this reciprocation be provided. The means which are generally illustrated in FIGS. 1, 6, 11 and 14 are those which are described in detail in a copending application Serial No. 363,789, filed in the names of Theodore P. Heuchling and Richard E. Kronauer. Although other types of linear actuators may be used, those described in the above identified Serial No. 363,789 are to be preferred. It will also be understood that any of the modifications which are adapted for effecting synchronized linear actuation with rotating motion as described in Serial No. 363,789 are applicable to the apparatus of this invention. For convenience, they have been illustrated as that type of apparatus which is shown and described in FIG. 1 of Serial No. 363,789.

Figure 4:
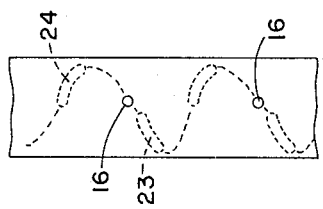
FIG. 4 is a developed view of the slide valve surfaces.
Figure 3:
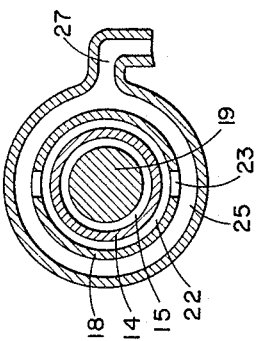
FIG. 3 is a cross-section of the piston end along lines 3—3 of FIG. 2.
Figure 2:
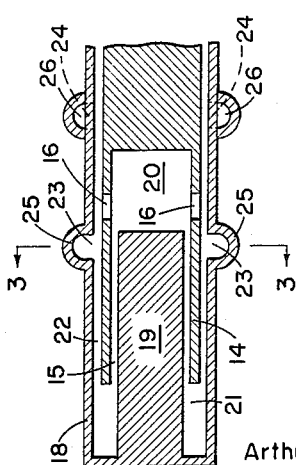
FIG. 2 is a detailed longitudinal cross-section through the end portion of the piston of the apparatus of FIG. 1.

The piston as illustrated in FIG. 1 and shown in greater detail in FIGS. 2 and 3, is seen to be formed of a piston rod 13 which terminates in a piston in the form of a cup with wall 14. Within this wall is defined a cylindrical recess 15, and the wall is equipped with two diametrically opposed ports 16. Surrounding the piston is a fluid tight housing 18 which has a cylinder head 19 extending into the housing 18. Within the piston housing, there are two communicating sections 20 and 21 which make up a fluid chamber subject to volume changes depending upon the reciprocating motion of the piston rod 13 and annular piston wall 14. Between the annular wall 14 of the piston and the internal wall of the housing 18, there is an annular passage 22 which is open to the fluid in the system. This it will be seen extends back to the spacing between the piston rod 13 and a portion of the linear actuator to provide the necessary annular passage for developing a gas bearing and a dynamic pressure seal. In piston housing 18 there are suitable high-pressure and low-pressure ports 23 and 24, respectively, which communicate with annular manifolds 25 and 26 surrounding the housing. These manifolds in turn communicate with a fluid load or source through conduits such as conduit 27 shown in FIG. 3. The size and configurations of these ports will of course depend upon pressure ratios desired and porting losses which are tolerable. It will be appreciated from a study of FIG. 1 that as the piston 10 reciprocates back and forth, the port 16 in the piston wall will cover and uncover the ports 23 and 24 in the piston housing. This is illustrated in more detail with reference to FIG. 2, and especially with reference to FIG. 4, the latter figure being a developed view of the slide valve system which is made up of ports 16 in the piston and ports 23 and 24 in the housing 18. FIG. 4 shows the relative position and the movement of these ports when the piston is reciprocating backwards and forwards. Thus, it will be seen that these ports, in effect, in their reciprocating and rotating, define a sinusoidal motion and that they periodically permit the introduction and exhausting of fluid. Assume, for example, that the apparatus of FIG. 1 is to act as a compressor. In this case the inlet ports 24 will be larger than the outlet ports 23, and will be adapted to introduce into the fluid chambers 20 and 21 low pressure fluid when the piston 10 has moved as far inboard as it will go. These ports 24 will then allow the low-pressure fluid to flow into chambers 20 and 21. With the movement of the piston in an outboard direction, the fluid within the chambers 20 and 21 is compressed and as the piston approaches its outboard-most position, the port 16 in the piston wall will come in line with the outlet ports 23 and thus discharge high-pressure fluid from the system.

Figure 5:
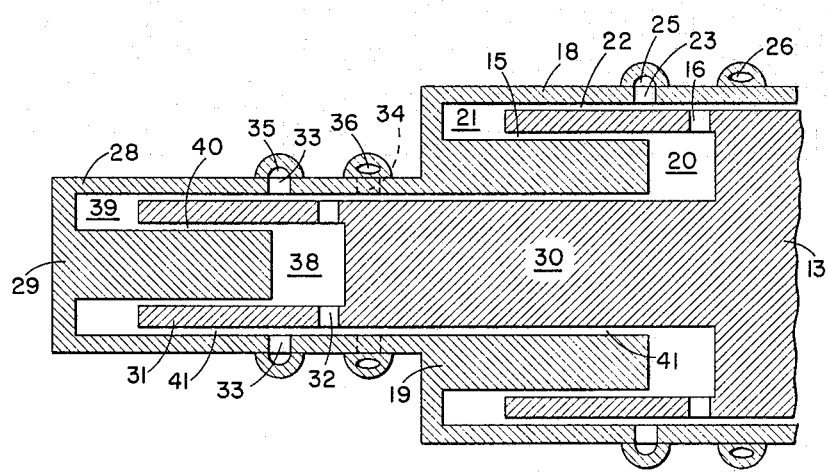
FIG. 5 is a longitudinal cross-section of a modification of the piston end of the apparatus.

FIG. 5 illustrates a modification of the piston of FIG. 1 in which a stepped or two-stage compression or expansion is permitted. In this modification, the piston housing 18 has a central concentric housing extension 28 which has a cylinder head 29, and the cylinder head 19 of the apparatus of FIG. 2 has a circular passage allowing for the passing therethrough of piston extension 30 which terminates in an annular wall 31 to give this inner extended piston a cup shape. Piston wall 31 has diametrically opposed ports 32 and housing extension 28 has high-pressure ports 33 and low-pressure ports 34, these ports communicating with fluid manifolds 35 and 36, respectively. The fluid chamber of the piston extension is comprised of volumes 38 and 39 which are in fluid communication by way of annular fluid passage 40. The annular passage 41 which is defined between the outer walls of annular wall 31 and piston extension 30 and the inner wall of extension housing 28 and the passage in cylinder head 19 is adapted to contain fluid and serve in the dual role of fluid bearing and fluid seal. A cross-section through any of the ports in the housings of FIG. 5 will be similar to that shown in FIG. 3 for the piston of FIG. 2.

The means by which the pistons are given the necessary reciprocating and rotating motions are also illustrated in FIG. 1.

As noted previously, the linear actuator shown in the figures included herein is that which is disclosed in detail in copending application Serial No. 363,789. It is shown in the following figures in somewhat diagrammatic outline form and references should be had to Serial No. 363,789 for the details of the construction of the linear actuator as well as of the rotating mechanism which is used in conjunction with it.

In FIG. 1 the stationary member of the linear actuator is shown as numeral 51. It will be seen to consist of a series of laminas of magnetic material in which are wound coils of copper 52. This stationary member 51 defines a gap 53 into which a moving member 54 is reciprocated back and forth. This moving member 54 is in turn attached to a suitable support 55.

The rotating mechanism of the apparatus of this invention is shown generally to consist of a rotor 60 and a stator 61, the rotor being mounted in ball bearing 62. Shaft 64 which is attached to the rotor 60, is in turn coupled to the piston 10 through means of an elastic member 65 shown here as a mechanical spring constructed of a solid material. This coupling is accomplished through suitable attaching members 67 and 68.

Around the entire apparatus is placed a suitable fluid-tight housing 72 which has a central support section 73, which in turn is equipped by means of bearing support 74 to position the rotating means for the apparatus.

Figure 6:
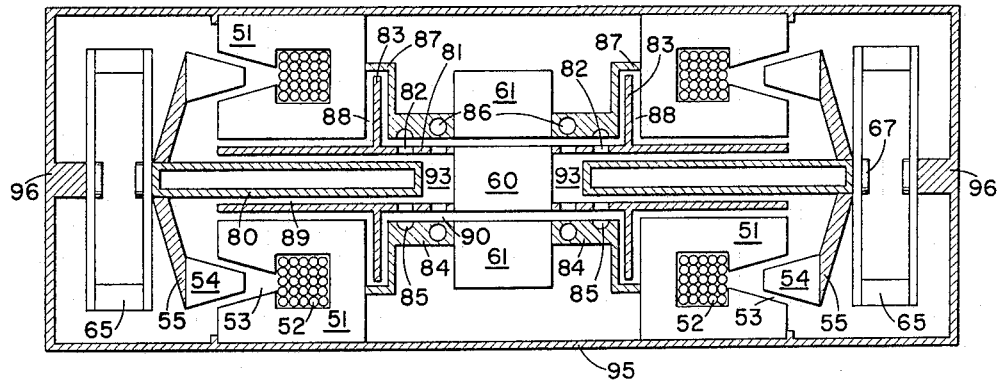
FIG. 6 is a cross-sectional view of another modification of the apparatus of this invention.

FIG. 6 illustrates a modification of the apparatus, and in this arrangement the pistons, the linear actuator armatures, and the spirngs reciprocate but do not rotate. In order to obtain the rotating motion necessary to use the slide valves of this invention, rotating sleeves are provided between the reciprocating pistons and stationary cylindrical walls. These sleeves are driven in rotation by a centrally located synchronous motor of either the reluctance or the permanent magnet type. The sleeves carry silde valves to couple the working chambers to high- and low-pressure manifolds. The rotating sleeves in this modification also develop gas films to support themselves relative to the cylinder walls and to support the pistons inside the sleeves. In this modification, gas-thrust bearings carried on these sleeves support the rotating assembly in the axial direction against unbalance in the opposed fluid forces in the working chamber. Although the modification in FIG. 6 shows metallic springs coupling the reciprocating motions to the frame, it could equally well incorporate fluid springs between the reciprocating pistons and the rotating sleeves, and coupled to the frame through the gas-thrust bearing. Fluid springs are illustrated in more detail in FIGS. 11 and 14.

In FIG. 6 elements which are similar to those of the apparatus in FIG. 1 have identical reference numerals.

Figure 7:
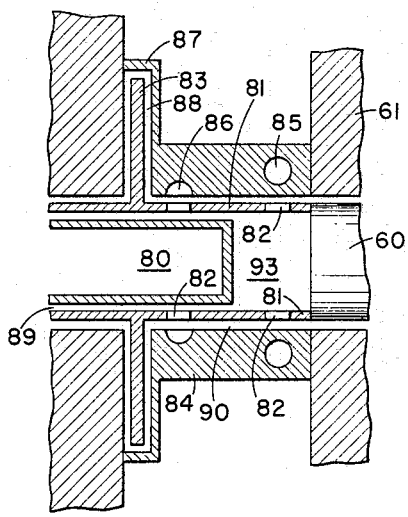
FIG. 7 is a cross-sectional detail of that portion of the apparatus showing one of the pistons.

The piston of the modification of FIGS. 6 and 7 is shown as a hollow piston 80. It reciprocates within a rotating sleeve 81, the sleeve having suitable ports 82. This rotating sleeve 81 has a disk extension 83. The entire sleeve is surrounded by a housing 84 which has an extension 87 surrounding disk extension 83. The rotating sleeve 81 is permanently attached to the rotor 60 of the rotating means so that it is capable of rotating around the piston. Thus the sleeve contributes a rotating action required of the ports 82 while the piston contributes a reciprocating action. The housing 84 has high-pressure ports 85 and low-pressure ports 86. Between the housing 84 and the rotating sleeve 81 is a fluid passage 90 which serves as a fluid bearing and seal. Fluid passage 89 between the piston wall and the rotating sleeve 81 is also a fluid bearing and seal. Finally, the spacing 88 between sleeve disk 83 and housing extension 87 contains fluid which serves as a fluid thrust bearing.

Figure 8:
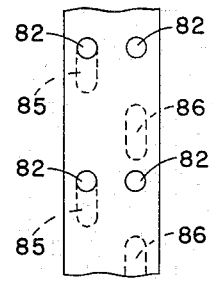
FIG. 8 is a developed view of the slide valve surfaces of the apparatus of FIG. 6.

Again as in the case of the apparatus of FIG. 1, valving is obtained by means of a slide-valve system wherein rotating sleeve 81 provides the necessary fluid ports by way of ports 85 and 86 in the housing 84. The changes in fluid pressure, i.e., either expansion or compression, are accomplished in the fluid chamber 93. The developed view of the slide-valve system of the apparatus of FIG. 6 is illustrated in FIG. 8 and it will be seen that as the sleeve 81 rotates it automatically brings the ports 82 into line with ports 85 and 86 and when synchronized with piston motion it controls the introduction and discharge of fluid into the chamber 93.

The entire appartus of FIG. 6 is enclosed in a suitable fluid-tight housing 95, which at each end has an extension 96 suitable for affixing a flexible member 65 to the housing for grounding it. This metallic spring which is illustrated here as the flexible member couples the reciprocating motions to the frame. It should be pointed out that the arrangement shown in FIG. 6 is not readily applicable to a compressor-expander combination to provide a refrigerator. This is due to the fact that some difficulty would be encountered in thermally isolating the two chambers 93, one of which would have to serve as a compressor and the other as an expander. Additionally unbalanced pressure forces would excessively load the thrust bearings. In using the apparatus of FIG. 6 as a two-cylinder expander it would be necessary to isolate thermally at least the central portion of the apparatus.

Figure 10:
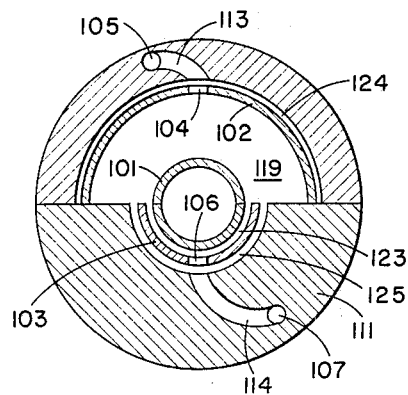
FIG. 10 is a cross-sectional view of the modified piston of FIG. 9 along lines 10—10 of FIG. 9.
Figure 9:
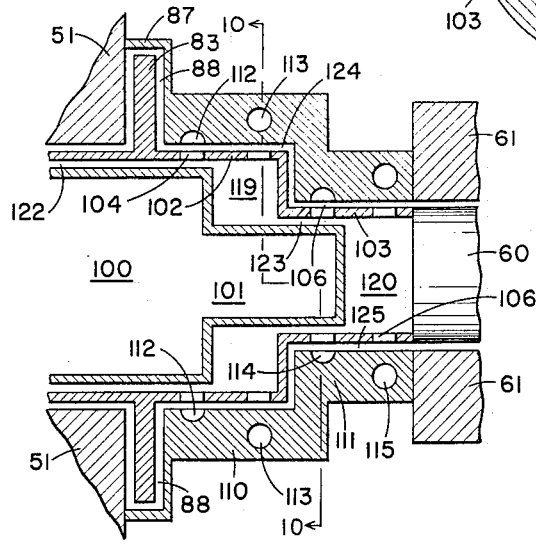
FIG. 9 is a cross-sectional view of a modification of the piston portion of the apparatus of FIG. 6.

FIGS. 9 and 10 show a modification of the valving system and piston of the apparatus of FIG. 6. As in FIG. 5 this provides for a two-stage compression or expansion and thus illustrates a stepped piston with its accompanying apparatus. The hollow piston of FIG. 9 is formed of a large diameter section 100 and a small diameter section 101. There is also provided a rotating sleeve which in turn is formed of a large diameter section 102 and a small diameter section 103. Section 102 is equipped with suitable ports 104, and section 103 with ports 106, operating in the same manner as described with respect to the apparatus of FIG. 6. Again as in the case of the apparatus of FIG. 6, the sleeve rotates because it is permanently fixed to the rotor 60 of the rotating mechanism shown in fragmentary view in FIG. 9. The cross section shown in FIG. 10 illustrates how the fluid conduit 113, which is in the larger diameter housing 110 surrounding the sleeve 102, communicates with the port 104 in the large diameter sleeve section 102 to permit the introduction into or the exhaustion of a fluid from chamber 119. This fluid conduit 113 terminates in a conduit 105 which in turn is adapted to supply fluid to or discharge fluid from the apparatus. It will be appreciated that a similar situation obtains with respect to the port 112. In a similar manner, the bottom half of the cross-sectional diagram of FIG. 10 illustrates how the port 114 communicates with a fluid conduit 107, and is in a position periodically to introduce or withdraw fluid into chamber 120 by means of port 106 in the smaller diameter section of the rotating sleeve. Again, the same arrangement will obtain with reference to port 115. The operation of the piston and rotating sleeve of the apparatus of FIG. 9 is essentially the same as that of the apparatus of FIG. 6. In a similar manner, the gas passages 122, 123, 124, and 125 provide the necessary spaces for establishing a fluid film which may act as a bearing and seal in each of these passages. The disk 83, which is an extension of the larger diameter section of the rotating sleeve, also provides the necessary thrust bearing with the housing 87 and the fluid passage 88.

The modification of FIG. 11 shows one-half of a balanced assembly in which metallic springs have been replaced by fluid springs. It will, of course, be appreciated that there is a corresponding oppositely directed right half to the apparatus shown in FIG. 11. Inasmuch as it is an identical mirror image of the apparatus shown, it need not be repeated. The fluid spring chambers are coupled to constant pressure manifolds at extremes of motion in order to insure that long-term leakage from these chambers cannot result in a gradually developing unbalance between them. The reciprocating assembly is coupled to the rotary actuator by means of an axially compliant but torsionally stiff coupling. The modification of FIG. 11 also shows a lightweight and lowly stressed bellows-like spring in place of the highly stressed spring or elastic member required in the apparatus of FIGS. 1 and 6. As in FIG. 6, the modification of FIG. 11 illustrates fluid thrust bearings and fluid radial bearings to support the rotary motor as well as the reciprocating and rotating piston and its shaft. Finally, the apparatus of FIG. 11 illustrates an alternative to the cup-shaped ported piston shown in FIG. 1. As in the cases of FIGS. 5 and 9, the piston of FIG. 11 is also adaptable to stepped pistons for a staged fluid process.

Turning now to FIG. 11, it will be seen that the piston is comprised of an outboard section 130, a central section 131, and an inboard section 132. These are all shown as hollow members, although it will be appreciated that they can be solid pistons. The hollow pistons are, of course, desired to minimize weight and accelerating forces. The outboard piston section 130 is equipped with a central fluid passage 134 which, in turn, leads to two radial fluid passages 135. These are shown in cross-sectional representation in FIGS. 12 and 13. A piston housing 138 surrounds the piston and extends inwardly to pass through the stationary member 51 of the linear actuator. In the piston housing 138 are high-pressure ports 139 and low-pressure ports 141 which communicate with fluid channels 140 and 142, respectively, as in the apparatus of FIGS. 2 and 3. External fluid conduits such as conduit 143 in FIG. 12 serve as a fluid communicating means with a fluid source or reservoir not shown. The fluid process of expansion or compression is carried out in the fluid chamber 145 which of course is of variable volume depending upon the reciprocating motion of the piston sections.

The central piston section 131 is seen to have a smaller diameter and thus to define with the internal walls of the piston housing 138 two chambers 151 which are suitable for containing high-pressure fluid and are separated from one another by the housing extension 152 and the dynamic gas seal 155. These two chambers comprise the fluid spring which is used in place of the mechanical springs of FIGS. 1 and 6. Between the wall of piston section 130 and the internal surface of housing 138 is an annular fluid passage 148; and between piston section 132 and housing 138 is an annular passage 153. Both of these passages 148 and 153 serve the dual role of fluid bearings and fluid seals.

Also in housing 138 are fluid ports 144 and 154 which are designed to supply, once each cycle, constant-pressure replenishing fluid to the working fluid in the fluid spring 151. Such replenishing of fluid is desirable to prevent unbalancing of the fluid spring resulting from any fluid loss. The reciprocating member 54 is attached to the rotor 60 by means of an axially compliant but torsionally stiff coupling and a rotating support 161 which has a disk extension 162 rotating within a suitable sheath 164 surrounding it. Between the disk 162 and the internal walls of the sheath 164 is a passage 165 which is also filled with constant pressure fluid, thus serving as a thrust bearing similar to that illustrated in the modification of FIG. 6.

In the modification illustrated in FIG. 11, the slide valve action is obtained in the reciprocation of the piston back and forth. In its reciprocation, the annular passage 135 comes alternately in line with port 139 and then with port 141. These may be inlet or outlet ports depending upon whether the apparatus is to be used as a compressor or an expander. Once the fluid has entered radial passages 135 it passes up through the central passage 134 into the fluid chamber 145.

The modification of the apparatus shown in FIG. 14 illustrates the use of a fluid spring in which the rotary motor rotor is directly coupled to the reciprocating assembly and reciprocates with the rotary motor stator thereby eliminating the bellows-like coupling and the thrust bearings required to support that rotor in some of the other modifications illustrated. In this apparatus of FIG. 14, all dynamic thrust forces contribute to reciprocating the pistons, and the average thrust forces merely result in an average displacement of the fluid springs. Synchronization between the action at opposite ends of a two-cylinder balanced assembly is accomplished by exciting both ends in synchronism from a common electrical supply. In this event, one synchronous motor stator can operate two reciprocating rotors as shown in FIG. 14. Inasmuch as these rotors reciprocate in a rotating synchronous field, it is necessary to counteract eddy currents arising from this reciprocating motion. This can be accomplished by laminating the rotors parallel to the axis of rotation. A rotor so laminated also has the reluctance characteristics appropriate to positive valve indexing. For starting purposes, it requires at least copper end rings to carry induction currents and perhaps also copper bars as well in a conventional squirrel cage arrangement.

As in the case of the apparatus of FIG. 11 the piston of the apparatus of FIG. 14 is divided into an outboard section 130, a central small-diameter section 131, and an inboard section 132, which in this case is connected directly to the moving member 54 through the suitable supports 55 and to one-half of the rotor 172 of the rotating mechanism. As explained above, this rotor is seen to have copper end rings 173. The piston, except for being hollow, is essentially the same arrangement as illustrated and described in FIG. 1, and the piston housing is also similar to that of FIG. 1 except that the housing of FIG. 1 does not contain the constant-pressure fluid ports 144 and 154 for replenishing the fluid spring 151 as described in connection with FIG. 11.

Inasmuch as one of the primary purposes of the apparatus of this invention is to serve as a refrigerator which is capable of operating over extended periods of time without servicing or without replacement of any parts, it will be interesting to look at it from the point of view of a refrigeration cycle to further illustrate one use for the apparatus. This may be done in a somewhat diagrammatic fashion with regard to FIGS. 15–17.

The refrigeration apparatus when constructed in accordance with this invention may operate on the reverse Brayton or the Collins cycle. This is shown in a schematic form in FIG. 15 and in the temperature-entropy plot for this cycle in FIG. 16. The circled letters of FIG. 16 correspond to those in the schematic cycle of FIG. 15. The ideal cycle is one in which expansion and compression are isentropic and it will be appreciated that when any form of the apparatus of this invention is adapted to a refrigeration system there will be design considerations in choosing the volumes for the two fluid chambers. For example, in FIG. 1 if the lefthand chamber is to serve as an expander, and the righthand chamber as a compressor to supply compressed fluid thereto, through a heat exchanger, the expander must be thermally isolated from the warmer parts of the apparatus and have a smaller displacement volume depending on the temperatures and pressures at inlet and exhaust of the compressor and expander.

Returning now to FIG. 15 it will be seen that low pressure gas entering a compressor at condition A is compressed to condition B (FIG. 16). In order to make the cycle more efficient an after-cooler is provided which serves to cool high-pressure gas after compression and before it enters the high pressure side of a main heat exchanger as reflected from condition C in FIG. 16. Thus the temperature after compression is returned almost to the point at which it entered the compressor. Subsequent to this first after-cooling, the high-pressure gas is further cooled in the main heat exchanger and reaches the expander at condition D as indicated in FIG. 16. Expansion which is not entirely isentropic takes place in the expander and the cold, low pressure gas at point E is then taken to a load (such as a sensing device) at which point it receives heat to reach condition F and then returns into the cycle at this condition to be used in the low-pressure side of the main heat exchanger to cool the incoming high-pressure gas.

As can be seen from the previous description of the apparatus, the compression and expansion of the fluid in this closed cycle is carried out at two ends of the apparatus through the proper stroking and rotation of a compressor and expander cylinders. Electromechanical forces are provided to balance the pressure forces within the cylinders, and the shafts on which the cylinders are mounted are rotated within the gas bearings as described above, thus eliminating any surface-to-surface contact and the resultant wear which goes with surface contact. Moreover, by using the refrigerant as a lubricant in the fluid bearings and seals any possible contamination of the refrigerant and any plugging of the heat exchangers and engines are prevented.

The balancing of the masses is shown diagrammatically in FIG. 17 which is presented to assist in understanding the working of the mechanism as a refrigerator. (It would of course work in a similar manner if the apparatus were used as an expander or a compressor.) Two balanced pistons (compressor and expander) reciprocate and rotate within the cylinders, the compressor piston doing work, the expander piston absorbing it. In this arrangement it will be seen that the compression and expansion pistons can be considered as two masses in the system and are at opposite ends of springs, thereby permitting operation at resonance where spring forces balance inertial forces. Because the demand of the tuning spring assembies increases as the mass of the stroking spindles to which the pistons are attached increase, the rotating drive motor (noted as a mass of synchronous motor armature) is located at the system nodal point (for the first node) thereby removing this mass from either of the oscillating members.

It will be seen from FIG. 17 that the actuator functions are divided into three separate actuators, the one providing rotation, a second compressor forces, and a third expander forces. This design permits the introduction of operational flexibility and by the placing of the rotational actuator at the nodal point in the spring assemblies, the weight and volume of the device are reduced and the energy storage requirements of the springs are reduced because they need not exchange energy with the mass of the rotational actuator rotor. Finally, this arrangement presents the opportunity to introduce a thrust bearing at the nodal point thereby providing substantial dynamic isolation between the compressor and the expander to simplify stabilization problems.

By appropriate choice of spring rates, masses and reciprocating amplitudes and phases, the spring forces can be maintained in balanced operation and loads on the thrust bearings ideally made zero. Similarly, by appropriate design of the linear actuator, electromagnetic forces on reciprocating members may be made at all times equal and opposite to gas forces on these members, ideally making net thrust forces transmitted to the housing zero.

In a like manner, it may be shown how the apparatus may serve wholly as a compressor or as an expansion engine, with only slight modification which are within the purview of any one skilled in the art.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:
1. A rotating, linearly reciprocating fluid handling apparatus, comprising in combination
   (a) a stationary fluid-tight enclosure;
   (b) a piston having rotating fluid ports associated therewith and being capable of being reciprocated within said stationary enclosure to define therein a fluid chamber of variable volume;
   (c) fluid inlet and outlet ports in said stationary enclosure;
   (d) electromagnetic linear actuating means directly affixed to said piston and adapted to impart linear reciprocating motion to said piston and to interact with the pressure forces of said fluid in said fluid chamber;
   (e) an elastic member connected to said linear actuating means and adapted to provide said piston and said linear actuating means those acceleration forces required for reciprocating said piston which are not provided by fluid in said fluid chamber and said linear actuating means and further to provide whatever average force is required to counterbalance any average difference between the forces delivered by said linear actuating means and those absorbed from said fluid; and
   (f) rotary actuating means adapted to rotate said rotating fluid ports relative to said fluid inlet and outlet ports, said linear and said rotary actuating means being synchronized whereby the reciprocating motion of said piston and the relative rotary motion of said rotating ports control the flow of fluid in and out of said fluid chamber.

2. An apparatus in accordance with claim 1 wherein said rotating fluid ports are in said piston and said rotary actuating means are connected to said piston.

3. An apparatus in accordance with claim 1 wherein said rotating fluid ports are in a rotating sleeve surrounding said piston and said rotary actuating means are connected to said sleeve.

4. An apparatus in accordance with claim 1 wherein said elastic member is a spring constructed of solid material.

5. An apparatus in accordance with claim 1 wherein said elastic member is a fluid spring.

6. An apparatus in accordance with claim 1 wherein the synchronized movements of said electromagnetic linear actuating means and said rotary actuating means are adapted to introduce a compressible fluid at high pressure into said chamber when said chamber is near minimum volume and to exhaust said compressible fluid at low pressure when said chamber is near maximum volume, whereby said compressible fluid provides a working force, said apparatus is an expander, and said linear actuating means is a generator.

7. An apparatus in accordance with claim 1 wherein the synchronized movement of said electromagnetic linear actuating means and said rotary actuating means are adapted to introduce a compressible fluid at low pressure into said chamber when said chamber is near maximum volume and to exhaust said compressible fluid at high pressure when said chamber is near minimum volume, whereby said piston provides a working force upon said compressible fluid, said apparatus is a compressor, and said linear actuating means is a motor.

8. An apparatus in accordance with claim 1 further characterized by having fluid journal bearings supporting at least a part of that portion of the apparatus which rotates.

9. An apparatus in accordance with claim 1 further characterized by having fluid seals.

10. An apparatus in accordance with claim 1 further characterized by having fluid thrust bearings.

11. An apparatus in accordance with claim 1 wherein said stationary fluid-tight enclosure and said piston are of a stepped configuration.

12. An apparatus in accordance with claim 1 wherein said elastic member is connected to said rotating actuating means.

13. An apparatus in accordance with claim 1 further characterized by having housing means surrounding it and said elastic member is connected to said housing means.

14. An apparatus in accordance with claim 1 wherein said elastic member is a fluid capable of accommodating relative rotational motion between said linear reciprocating means and a housing enclosing said fluid and upon which elastic forces act.

15. A dynamically balanced, rotating and linearly reciprocating fluid handling apparatus, comprising in combination
   (a) two axially-opposed stationary fluid-tight enclosures;
   (b) two axially-opposed pistons having rotating fluid ports associated therewith and being capable of being reciprocated within said stationary enclosures to define therein fluid chambers of variable volume;
   (c) fluid inlet and outlet ports in each of said stationary enclosures;
   (d) two axially-opposed electromagnetic linear actuating means directly affixed to said pistons and adapted to impart linear reciprocating motion to said pistons and to interact with the pressure forces of said fluid in said fluid chambers;

(e) elastic members connected to each of said linear actuating means and adapted to provide each of said pistons and each of said linear actuating means those acceleration forces required for reciprocating said pistons which are not provided by fluid in said fluid chambers and said linear actuating means and further to provide whatever average forces are required to counterbalance any average difference between the forces delivered by said linear actuating means and those absorbed from said fluid; and (f) rotary actuating means centrally positioned between said pistons and adapted to rotate said rotating fluid ports relative to said fluid inlet and outlet ports, said linear and said rotary actuating means being synchronized whereby the reciprocating motion of said pistons and the relative rotating motion of said rotating ports control the flow of fluids in and out of said fluid chambers.

16. An apparatus in accordance with claim 15 wherein said rotating fluid ports are in said pistons and said rotary actuating means are connected to said pistons.

17. An apparatus in accordance with claim 15 wherein said rotating fluid ports are in rotating sleeves surrounding said pistons and said rotary actuating means are connected to said sleeves.

18. An apparatus in accordance with claim 15 wherein the synchronized movements of said electromagnetic linear actuating means and said rotary actuating means are adapted to introduce a compressible fluid at high pressure into said chambers when said chambers are near minimum volume and to exhaust said compressible fluid at low pressure when said chambers are near maximum volume, whereby said compressible fluid provides a working force, said apparatus is an expander, and said linear actuating means are generators.

19. An apparatus in accordance with claim 15 wherein the synchronized movements of said electromagnetic linear actuating means and said rotary actuating means are adapted to introduce a compressible fluid at low pressure into said chambers when said chambers are near maximum volume and to exhaust said compressible fluid at high pressure when said chambers are near minimum volume, whereby said pistons provide a working force upon said compressible fluid, said apparatus is a compressor, and said linear actuating means are motors.

20. An apparatus in accordance with claim 15 further characterized by having fluid conduit means communicating between said chambers and heat exchange means associated with said fluid conduit means, and wherein the synchronized movements of said electromagnetic linear actuating means and said rotary actuating means are adapted to control the flow of fluid into said chambers whereby one of said chambers achieves fluid expansion and the other of said chambers achieves fluid compression and said apparatus is a refrigerator.

21. An apparatus in accordance with claim 15 wherein said elastic members are springs constructed of a solid material.

22. An apparatus in accordance with claim 15 wherein said elastic members are fluid springs.

23. An apparatus in accordance with claim 22 further characterized by having fluid ports communicating with said fluid springs and adapted to replenish said fluid springs with constant-pressure fluid.

24. An apparatus in accordance with claim 15 wherein at least a portion of that part of the apparatus which rotates is supported by fluid journal bearings.

25. An apparatus in accordance with claim 15 further characterized by having fluid thrust bearings.

26. An apparatus in accordance with claim 15 further characterized by having fluid seals.

27. An apparatus in accordance with claim 15 wherein said stationary fluid-tight enclosures and said pistons are of a stepped configuration.

References Cited by the Examiner
UNITED STATES PATENTS

| | | | |
|---|---|---|---|
| 1,036,797 | 8/1912 | Castle | 230—173 |
| 1,582,264 | 4/1926 | Gribojedoff | 230—179 X |
| 1,611,866 | 12/1926 | Aikman | 230—179 |
| 1,669,734 | 5/1928 | Bennet | 230—179 |
| 1,755,075 | 4/1930 | Ricardo | 230—179 |
| 2,582,157 | 1/1952 | Pica | 230—173 |
| 2,906,101 | 9/1959 | McMahon et al. | 62—87 X |

ROBERT A. O'LEARY, *Primary Examiner.*

W. W. WAYNER, *Assistant Examiner.*